US010302802B2

(12) United States Patent
Hou et al.

(10) Patent No.: US 10,302,802 B2
(45) Date of Patent: May 28, 2019

(54) APPARATUS AND METHODS OF SKIN EFFECT CORRECTION

(75) Inventors: Junsheng Hou, Kingwood, TX (US); Luis E. San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/377,426

(22) PCT Filed: Feb. 16, 2012

(86) PCT No.: PCT/US2012/025477
§ 371 (c)(1),
(2), (4) Date: Aug. 7, 2014

(87) PCT Pub. No.: WO2013/122590
PCT Pub. Date: Aug. 22, 2013

(65) Prior Publication Data
US 2015/0032376 A1   Jan. 29, 2015

(51) Int. Cl.
*G01V 3/26* (2006.01)
*G01V 3/38* (2006.01)
*G01V 3/20* (2006.01)

(52) U.S. Cl.
CPC ............... *G01V 3/38* (2013.01); *G01V 3/20* (2013.01); *G01V 3/26* (2013.01)

(58) Field of Classification Search
CPC ... G01V 3/38; G01V 3/20; G01V 3/30; G01V 3/28; E21B 7/04; E21B 47/022; E21B 47/10
USPC .............. 324/333, 338, 339; 702/7, 9, 6, 11; 166/250.01
See application file for complete search history.

(56) References Cited

U.S. PATENT DOCUMENTS

| | | | |
|---|---|---|---|
| 3,147,429 A | | 9/1964 | Moran |
| 4,313,164 A | * | 1/1982 | Regat ..................... G06T 17/05 324/323 |
| 4,467,425 A | | 8/1984 | Schaefer |
| 4,471,436 A | | 9/1984 | Schaefer |

(Continued)

FOREIGN PATENT DOCUMENTS

| | | |
|---|---|---|
| GB | 2311376 A | 9/1997 |
| WO | WO-2013122590 A1 | 8/2013 |

OTHER PUBLICATIONS

"International Application Serial No. PCT/US2012/025477, International Preliminary Report on Patentability dated Apr. 3, 2014", 6 pgs.

(Continued)

*Primary Examiner* — John E Breene
*Assistant Examiner* — Jeffrey P Aiello
(74) *Attorney, Agent, or Firm* — Gilliam IP PLLC

(57) ABSTRACT

Various embodiments include apparatus and methods to provide a skin-effect correction. The skin-effect correction can be based on a pre-calculated correction coefficient library. In various embodiments, a skin-effect correction procedure can be applied that only uses a single-frequency R-signal measurement. In addition, an embodiment of a skin-effect correction procedure using a single-frequency R-signal measurement can be applied whenever the quality of the data from one of the multiple frequencies normally used in a multi-frequency method is reliable. Additional apparatus, systems, and methods are disclosed.

19 Claims, 11 Drawing Sheets

(56) References Cited

U.S. PATENT DOCUMENTS

| | | | |
|---|---|---|---|
| 4,513,376 A | | 4/1985 | Barber |
| 4,958,286 A | | 9/1990 | Meyer, Jr. |
| 5,146,167 A | * | 9/1992 | Strickland et al. ............ 324/339 |
| 5,157,605 A | * | 10/1992 | Chandler et al. ................. 702/7 |
| 5,210,691 A | * | 5/1993 | Freedman et al. ................ 702/7 |
| 5,448,171 A | * | 9/1995 | Chemali ................. G01V 3/28 324/339 |
| 5,511,037 A | * | 4/1996 | Randall et al. ................. 367/33 |
| 5,666,057 A | | 9/1997 | Beard et al. |
| 5,698,982 A | | 12/1997 | Mitchell |
| 6,219,619 B1 | * | 4/2001 | Xiao et al. ......................... 702/7 |
| 6,574,562 B2 | * | 6/2003 | Tabarovsky et al. ............. 702/7 |
| 6,597,993 B2 | * | 7/2003 | Strickland et al. ............... 702/7 |
| 2001/0039477 A1 | * | 11/2001 | Xiao et al. ......................... 702/6 |
| 2003/0004647 A1 | * | 1/2003 | Sinclair ............................. 702/7 |
| 2003/0016020 A1 | * | 1/2003 | Gianzero ................. G01V 3/28 324/342 |
| 2004/0154831 A1 | * | 8/2004 | Seydoux ................... E21B 7/04 175/24 |
| 2005/0040828 A1 | * | 2/2005 | Xiao ............................. 324/339 |
| 2005/0278121 A1 | * | 12/2005 | Tabarovsky ............. G01V 3/28 702/9 |
| 2008/0033654 A1 | * | 2/2008 | Bespalov et al. ................. 702/7 |
| 2010/0109672 A1 | * | 5/2010 | Rabinovich et al. .......... 324/338 |
| 2012/0109527 A1 | * | 5/2012 | Bespalov et al. ................. 702/7 |
| 2014/0015530 A1 | * | 1/2014 | Miles et al. .................. 324/339 |
| 2014/0350858 A1 | * | 11/2014 | Donderici ................. E21B 7/04 702/7 |

OTHER PUBLICATIONS

"International Application Serial No. PCT/US2012/025477, International Search Report dated Dec. 14, 2012", 3 pgs.

"International Application Serial No. PCT/US2012/025477, Written Opinion dated Dec. 14, 2012", 4 pgs.

Liu, G., et al., "A New Method to Correct the Effect of Skin-Effect in Induction Logs", SPWLA 41st Annual Logging Symposium, Jun. 4-7, Dallas, Texas, (2000).

Doll, Henri G., "Introduction to Induction Logging and Application to Logging of Wells Drilled with Oil Based Mud", *Journal of Petroleum Technology*, 1(6), (Jun. 1949), 148-162.

Sanmartin, L., et al., "Application of new asymmetrical array induction logging tool in hostile environments", *SPWLA 48th Annual Logging Symposium*, Jun. 3-6, 2007, Austin, TX, (2007), 1-10.

"European Application Serial No. 12705957.4, Office Action dated Oct. 6, 2014", 2 pgs.

"European Application Serial No. 12705957.4, Response filed Mar. 31, 2015 to Office Action dated Oct. 6, 2014", 10 pgs.

Sanmartin, L., et al., "Application of a new asymmetrical array induction logging tool in hostile environments", SPWLA 48th Annual Logging Symposium, Jun. 3-6, 2007, Austin, TX, (2007).

Xiao, J., et al., "A New Asymmetrical Array Induction Logging Tool", SPE 101930, SPE Annual Technical Conference and Exhibition, Sep. 24-27, San Antonio, Texas, USA, (2006), 1-15.

"Canadian Application Serial No. 2,863,588, Office Action dated Nov. 13, 2015", 3 pgs.

"Mexican Application Serial No. MX/a/2014/009890, Office Action dated Jul. 10, 2015", (w/ English Summary), 3 pgs.

"Mexican Application Serial No. MX/a/2014/009890, Response filed Sep. 25, 2015 to Office Action dated Jul. 10, 2015", (w/ English Translation of Amended Claims), 16 pgs.

"Canadian Application Serial No. 2,863,588, Response filed May 11, 2016 to Office Action dated Nov. 13, 2015", 16 pgs.

"Gulf Cooperation Council Application Serial No. 2013/23559, Office Action dated Jul. 25, 2016", 4 pgs.

\* cited by examiner

__US 10,302,802 B2__

APPARATUS AND METHODS OF SKIN EFFECT CORRECTION

PRIORITY APPLICATION

This application is a U.S. National Stage Filing under 35 U.S.C. 371 from International Application No. PCT/US2012/025477, filed on 16 Feb. 2012, and published on 22 Aug. 2013 as WO 2013/122590 A1, which application and publication are incorporated herein by reference in their entirety.

TECHNICAL FIELD

The present invention relates generally to apparatus for making measurements related to oil and gas exploration.

BACKGROUND

In drilling wells for oil and gas exploration, understanding the structure and properties of the associated geological formation provides information to aid such exploration. Measurements in a borehole are typically performed to attain this understanding. However, the environment in which the drilling tools operate is at significant distances below the surface and measurements to manage operation of such equipment are made at these locations.

Logging is the process of making measurements via sensors located downhole, which can provide valuable information regarding the formation characteristics. For example, induction logging can utilize electromagnetic signals that can be used to make measurements. As an electromagnetic field penetrates into a conductive medium, the electromagnetic field can experience a loss in amplitude and change in phase. This loss and change in phase can be referred to as the skin effect. In an induction log, the skin effect causes a reduction of both of the R-phase (in-phase) and the X-signal (out-of-phase) signal at a receiver of the induction tool.

Accurate correction of skin effect plays an important role in wireline induction log data processing. For skin-effect correction (SEC), multi-frequency SEC methods using only R-signal data and single-frequency SEC methods using both R-signal and X-signal data are widely used in the logging industry. The multi-frequency SEC methods typically do not work very well if only one-frequency signal is available. An R-signal is a resistive signal that is a portion of an alternating signal at a receiver of an induction logging tool such that the resistive signal is in phase with the transmitter current of the induction logging tool. The R-signal depends on formation conductivity, where a signal out-of-phase with the transmitter current is a reactive signal, referred to as an X-signal. The X-signal also depends on formation conductivity, in a manner different from the R-signal.

Examples of induction logging systems that can operate at multiple frequencies include Halliburton's Hostile Array Compensated Resistivity Tool (HACRt™) logging system and Array Compensated Resistivity Tool (ACRt™) logging system. HACRt™ has an asymmetric design that consists of a single transmitter operating at three frequencies and six receiver antennas with spacing from 6 to 80 inches. ACRt™ incorporates a transmitter that operates at three frequencies simultaneously with six sub-asymmetrical arrays of antennas strategically spaced from 6 to 80 inches from the transmitter. Further, the usefulness of such measurements may be related to the precision or quality of the information derived from such measurements.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a skin-effect correction process can be applied that only uses a single-frequency R-signal measurement. The correction can be based on a pre-calculated correction coefficient library. The SEC results of such a process are comparable to the standard multi-frequency skin-effect correction. A pre-calculated correction coefficient library for the single-frequency SEC can also be applied to a multi-frequency skin-effect correction. In addition, an embodiment of a SEC process using a single-frequency R-signal measurement can be applied whenever the quality of the data from one or more frequencies normally used in the multi-frequency method is reliable.

Figure 1:
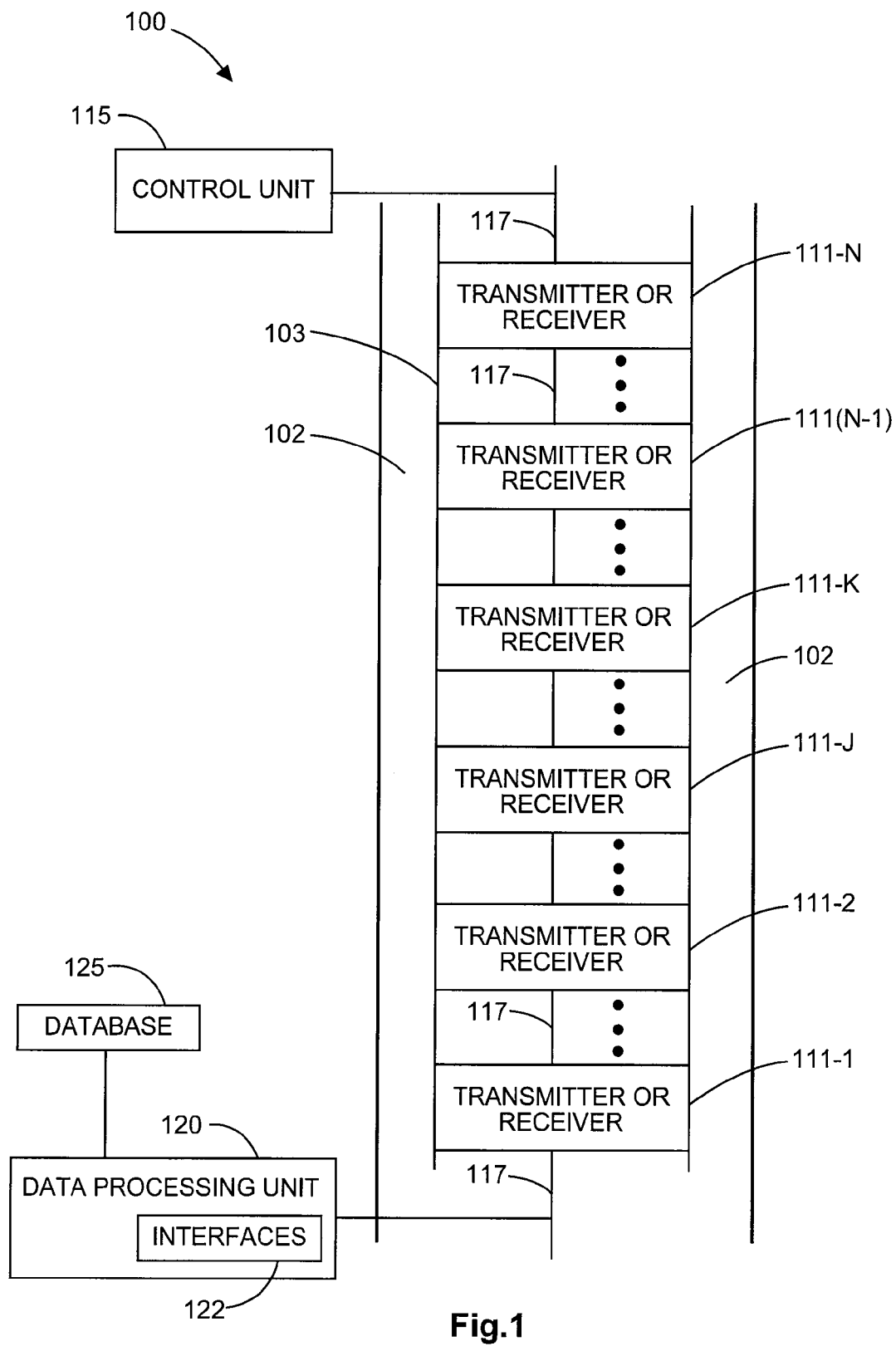
FIG. 1 shows a block diagram of an example system having a data processing unit structured to calculate an apparent conductivity having a skin-effect correction, in accordance with various embodiments.

FIG. 1 shows a block diagram of an example embodiment of a system 100 having a data processing unit 120 structured to calculate an apparent conductivity having a skin-effect correction and a database 125 arranged to store and provide access to weight coefficients for use with the data processing unit 120. The data processing unit 120 can include a number of interfaces 122. One of the interfaces 122 can be used to output information from the data processing unit 120. One of the interfaces 122 can be arranged to collect R-signal data from a receiver of a tool 103. The interfaces 122 can be structured as a single unit to collect data and to output data. The R-signal data can correspond to the tool 103 operated at a single frequency over a length of a borehole 102. Each of the weight coefficients from the database 125 to be used with the data processing unit 120 can correspond to a distance in the length over which the R-signal data is collected. The tool 103 can be structured as an induction logging tool. The data processing unit 120 can be structured to be operable to conduct a convolution filtering of conductivity values and the weight coefficients, where the conductivity values can be derived from the R-signal measurement data.

System 100 can include tool 103 having an arrangement of sensors 111-1, 111-2 . . . 111-(N−1), 111-N along a longitudinal axis 117 of tool structure 103. With sensors 111-1, 111-2 . . . 111-(N−1), 111-N along a longitudinal axis 117, the sensors 111-1, 111-2 . . . 111-(N−1), 111-N can have an axis substantially parallel with the longitudinal axis 117. Each sensor 111-1, 111-2 . . . 111-(N−1), 111-N can be utilized as a transmitting sensor or a receiving sensor under the control of a control unit 115 to operate in borehole 102. At least two sensors, for example 111-J and 111-K, of the sensors 111-1, 111-2 . . . 111-(N−1), 111-N can be structured to collect R-signal data, where one or two of these sensors 111-J and 111-K operates as a receiver and the other one of these sensors 111-J and 111-K operates as a transmitter associated with the receiver. The two sensors 111-J and 111-K can operate together arranged to collect logging data such that the R-signal data is operably provided to one of the interfaces 122. Sensors 111-J and 111-K can be arranged with one or more additional receivers of the sensors 111-1, 111-2 . . . 111-(N−1), 111-N, to collect logging data such that the R-signal data is operably provided to one of the interfaces 122, where these receivers are separated from the transmitter, for example the sensor 111-J, by different distances.

The tool 103 can include the control unit 115 operable to manage generation of signals from the sensor 111-J as a transmitter and collection of received signals at the receiver sensor 111-K and other additional receivers of the sensors 111-1, 111-2 . . . 111-(N−1), and 111-N. The control unit 115 can be structured to control the receiver sensor 111-K and the transmitter sensor 111-J to provide signals to the data processing unit 120, where the data processing unit 120 can be structured to use operatively only R-signal data from single frequency R-signal measurements to generate the skin-effect correction. The control unit 115 can be structured to control the receiver sensor 111-K and the transmitter sensor 111-J to operate at a plurality of operating frequencies and provide signals to the data processing unit 120, where the data processing unit 120 can be structured to operatively select a mode of operation from a single frequency mode or a multiple frequencies mode.

The data processing unit 120 can be structured to operatively generate the weight coefficients for use in skin-effect correction procedures and store the weight coefficients in the database 125. Generating weight coefficients and storing the weight coefficients in the database 125 can be conducted prior to making R-signal measurements of a formation property such as conductivity. The weight coefficients can be based on geometrical factors of resistivity logging tools. The geometrical factors can be based on Doll's vertical geometrical factors and Bom's vertical geometric factors. The data processing unit 120 can be structured to generate the weight coefficients by operatively using a least squares procedure. The database 125 can include a pre-calculated correction coefficient library to generate the skin-effect correction. The weights can be used by the data processing unit 120 structured to operatively calculate apparent conductivity having the skin-effect correction by the generation of the apparent conductivity after the skin-effect correction as defined by $$\sigma_{SEC}(z) = \sum_j w(z_j) \cdot \sigma_R(z - z_j),$$

where $\sigma_R(z-z_j)$ is the apparent conductivity derived from R-signal measurement data at $z-z_j$, and $w(z_j)$ is a weight coefficient at distance $z_j$.

Figure 2:
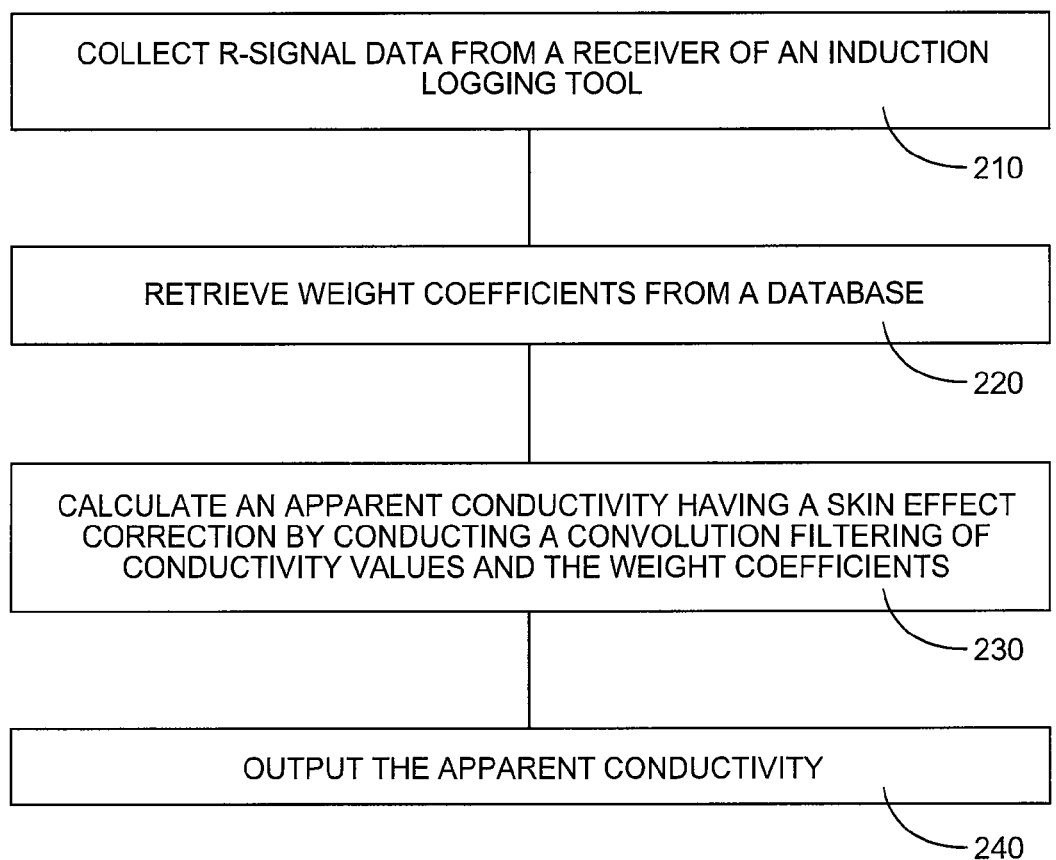
FIG. 2 shows features of an example embodiment of a method that provides skin-effect correction to a conductivity measurement, in accordance with various embodiments.

FIG. 2 shows features of an example embodiment of a method that provides skin-effect correction to a conductivity measurement. The method may include other features from the teaching provided herein. At 210, R-signal data is collected from receivers of an induction logging tool. The R-signal data can correspond to the induction logging tool operating at a single frequency or multiple frequencies over a logging section of a borehole. A skin-effect correction may be conducted such that the skin-effect correction procedure only uses R-signal data from single-frequency R-signal measurements. At 220, weight coefficients are retrieved from a database. Each of the weight coefficients can correspond to a distance in a depth window along the length of the borehole.

At 230, a skin-effect correction apparent conductivity having a skin-effect correction can be calculated by conducting a convolution filtering of conductivity values and the weight coefficients, where the apparent conductivity values can be derived from the R-signal data. A skin-effect correction can be based on a pre-calculated correction coefficient library. Calculating the apparent conductivity having the skin-effect correction can include generating the apparent conductivity after the skin-effect correction as defined by $$\sigma_{SEC}(z) = \sum_j w(z_j) \cdot \sigma_R(z - z_j),$$

where $\sigma_R(z-z_j)$ is apparent conductivity derived from R-signal data at $z-z_j$, and $w(z_j)$ is a weight coefficient at distance $z_j$. In an embodiment, features of a method that provides skin-effect correction to a conductivity measurement can include generating the weight coefficients and storing the weight coefficients in the database prior to collecting the R-signal data of the conductivity measurement. Generating the weight coefficients can include generating the weight coefficients from geometrical factors. Generating the weight coefficients can include generating the weight coefficients from processing a relationship given by $$\sum_j w(z_j) \cdot g_{BV}(z-z_j) = g_{DV}(z)$$

where $w(z_j)$ is a weight coefficient at distance $z_j$, $g_{DV}(z)$ is a Doll vertical geometrical factor, and $g_{BV}(z-z_j)$ is a real part of a Born vertical geometric factor at $z-z_j$. Processing the relationship can include using a least squares method. At 240, the apparent conductivity can be output. The apparent conductivity can be output to a processing unit or an application of a processing unit that processes data for use in oil or gas drilling operations or formation evaluations. The operations may be land based or water based operations.

Methods that can provide skin-effect correction to a conductivity measurement can be implemented in a system comprising: a tool having a transmitter sensor and a receiver sensor, the transmitter sensor and the receiver sensor set apart from each other by a separation distance; a control unit operable to manage generation of transmission signals from the transmitter sensor and collection of received signals at the receiver sensor, each received signal based on one of the transmission signals; and a data processing unit, wherein the tool, the control unit, and the data processing unit are configured to perform operations of methods as discussed herein.

Skin-effect correction procedures and associated apparatus can be arranged to physically implement adaptations to geometrical factors (or response functions) of induction logging tools. In induction log data processing, the response functions that produce the log can be used. However, with the exact response functions not available for induction tools, geometrical factors can be used as approximations of the response functions. The response function describes the input-output relationship of a system. The response function of an induction logging tool may provide an analytical relationship between the conductivity in a formation to the measured apparent conductivity in a receiver of an induction logging tool. Known geometrical factor theories include the Doll geometrical factor theory and the Born geometrical factor theory. Embodiments of apparatus and processes as taught herein can make use of Doll geometrical factors and Born geometrical factors.

From Doll geometrical factor theory in induction logging, the real apparent conductivity for an induction logging tool in a two-dimensional (2D) borehole-formation model can be determined by $$\sigma_D = \int\int_S g_D(z-z', p) \cdot \sigma_t(z', p) dp\, dz' \quad (1)$$

where $\sigma_D(z)$ is the Doll apparent conductivity without the skin effect, $g_D(z-z', p)$ is the Doll's 2D unit geometrical factor, $\sigma_t(z', p)$ is the true formation conductivity, and $z$ is the logging depth in a borehole. Assuming that the earth formation is a vertical one-dimensional (1D) formation model, one can let $\sigma_t(z',p)=\sigma_t(z)$. Then, equation (1) reduces to $$\sigma_D(z) = \int g_{DV}(z-z') \cdot \sigma_t(z') dz', \quad (2)$$

where $g_{DV}(z-z')$ is the Doll's vertical geometrical factor (VGF)/response function. Here, $g_{DV}(z-z')$ is only a function of geometrical parameters, for example, position and logging tool spacing.

Figure 3:
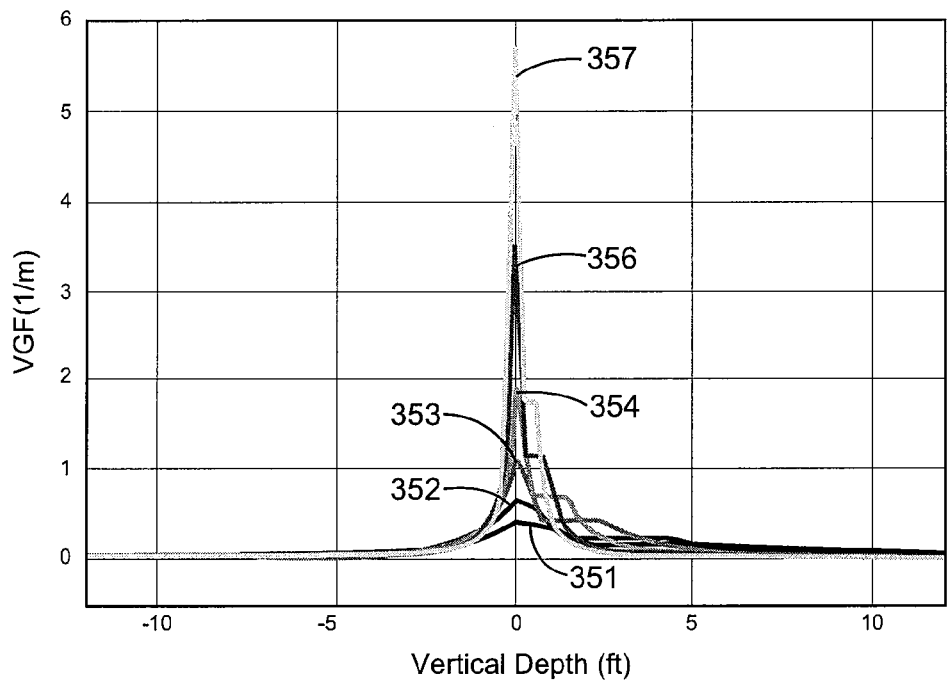
FIG. 3 shows Doll's vertical geometric factors of ACRt™/HACRt™ resistivity logging tools having transmitter-receiver sub-arrays, in accordance with various embodiments.

FIG. 3 shows Doll VGFs for six transmitter-receiver sub-arrays of ACRt/HACRt tool. A transmitter-receiver sub-array can be referenced by the spacing distance between the transmitter and the receiver of the sub-array. For example, an induction tool may include one transmitter separated from six different receivers at six different spacing distances. In FIG. 3, the curve 351 is for a sub-array having a transmitter-receiver separation of 80 inches. The curve 352 is for a sub-array having a transmitter-receiver separation of 50 inches. The curve 353 is for a sub-array having a transmitter-receiver separation of 29 inches. The curve 354 is for a sub-array having a transmitter-receiver separation of 17 inches. The curve 356 is for a sub-array having a transmitter-receiver separation of 9.6 inches. The curve 357 is for a sub-array having a transmitter-receiver separation of 6 inches.

In a homogeneous medium, $\sigma_t$ is constant and $\int g_{DV}(z-z')=1$, in which case equation (2) yields $\sigma_D(z)=\sigma_t$. From the Born electromagnetic (EM) approximation theory, the apparent conductivity for the same formation model as the above is expressed as $$\sigma_R(z) = \int\int_S g_B(z-z', p) \cdot \sigma_t(z', p) dp\, dz' \quad (3)$$
$$= \int g_{BV}(z-z') \cdot \sigma_1(z') dz',$$

Here, $\sigma_R(z)$ is the R-signal apparent conductivity including the skin effect, $g_B(z-z', p)$ is the real part of the Born unit geometric factor, and $g_{BV}(z-z')$ is the real part of the Born VGF. Both $g_B(z-z',p)$ and $g_{BV}(z-z')$ are not only functions of geometric parameters, but are also functions of the background formation conductivity and frequency.

Figure 4:
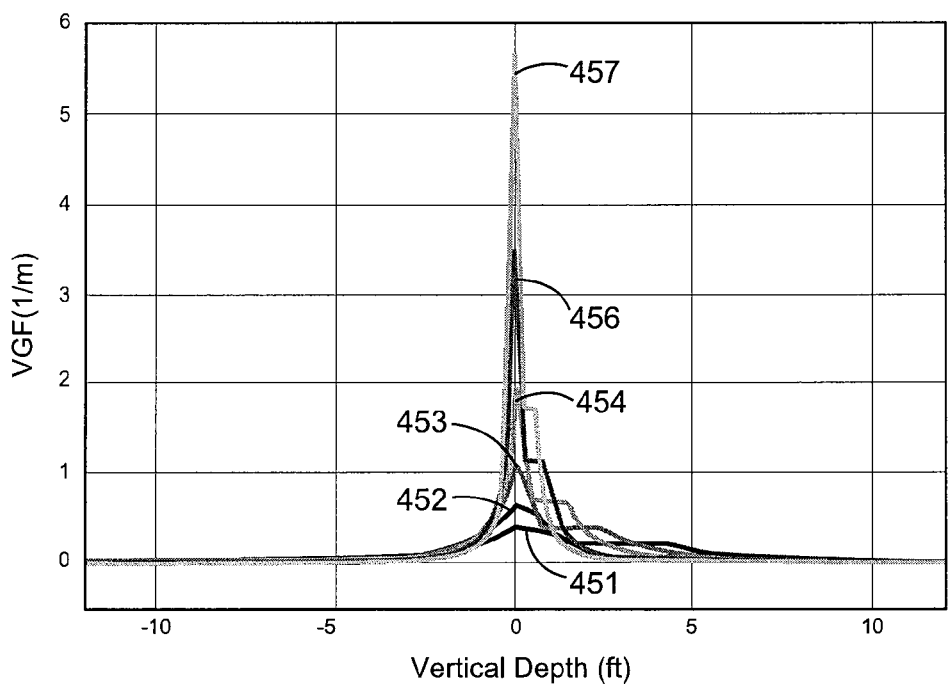
FIGS. 4-6 show Born's vertical geometric factors of ACRt™/HACRt™ logging resistivity tools having transmitter-receiver sub-arrays operating at different frequencies, in accordance with various embodiments.
Figure 5:
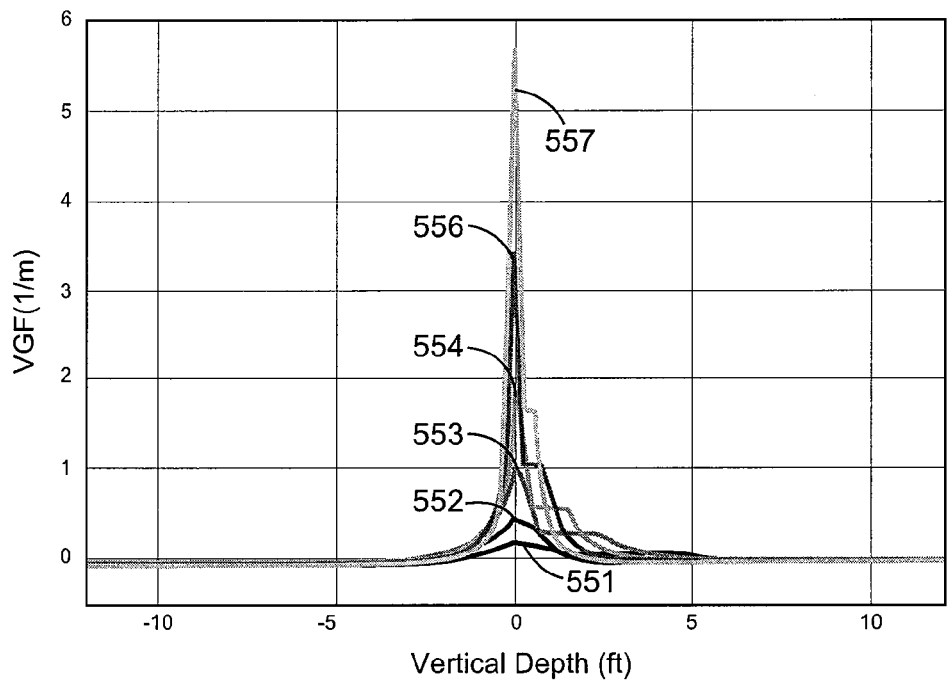
Figure 6:
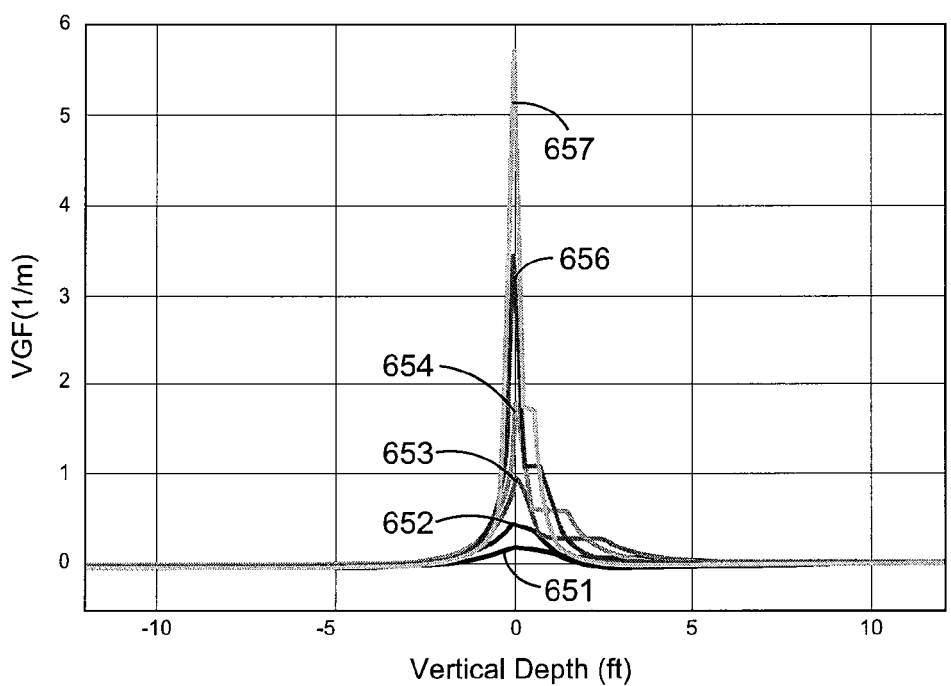

FIGS. 4-6 show Born VGFs of ACRt/HACRt tool at frequencies of 12 kHz, 36 kHz, and 72 kHz, respectively, with a background formation conductivity of 1 S/m. In FIG. 4, the curve 451 is for a sub-array having a transmitter-receiver separation of 80 inches. The curve 452 is for a sub-array having a transmitter-receiver separation of 50 inches. The curve 453 is for a sub-array having a transmitter-receiver separation of 29 inches. The curve 454 is for a sub-array having a transmitter-receiver separation of 17 inches. The curve 456 is for a sub-array having a transmitter-receiver separation of 9.6 inches. The curve 457 is for a sub-array having a transmitter-receiver separation of 6 inches.

In FIG. 5, the curve 551 is for a sub-array having a transmitter-receiver separation of 80 inches. The curve 552 is for a sub-array having a transmitter-receiver separation of 50 inches. The curve 553 is for a sub-array having a transmitter-receiver separation of 29 inches. The curve 554 is for a sub-array having a transmitter-receiver separation of 17 inches. The curve 556 is for a sub-array having a transmitter-receiver separation of 9.6 inches. The curve 557 is for a sub-array having a transmitter-receiver separation of 6 inches.

In FIG. 6, the curve 651 is for a sub-array having a transmitter-receiver separation of 80 inches. The curve 652 is for a sub-array having a transmitter-receiver separation of 50 inches. The curve 653 is for a sub-array having a transmitter-receiver separation of 29 inches. The curve 654 is for a sub-array having a transmitter-receiver separation of 17 inches. The curve 656 is for a sub-array having a transmitter-receiver separation of 9.6 inches. The curve 657 is for a sub-array having a transmitter-receiver separation of 6 inches. From FIGS. 3-6, the larger differences between the Doll VGFs and the Born VGFs occur at higher frequencies.

The apparent conductivity after the skin-effect correction can be expressed in terms of a convolution as $$\sigma_{SEC}(z) = \sum_j w(z_j) \cdot \sigma_R(z - z_j), \quad (4)$$

where $\sigma_{SEC}(z)$ is the apparent conductivity after the SEC, which can be referred to as SEC apparent conductivity. The terms $w(z_j)$ are the weight coefficients of the convolution filter. The target for the $\sigma_{SEC}(z)$ is $\sigma_D(z)$ of equation (1).

After substituting equation (3) into equation (4), equation (4) can be rewritten as $$\sigma_{SEC}(z) = \sum_j w(z_j) \cdot \int g_{BV}(z - z_j - z') \cdot \sigma_1(z') dz' \quad (5)$$

or $$\sigma_{SEC}(z) = \int \left\{ \sum_j w(z_j) \cdot g_{BV}(z - z' - z_j) \right\} \cdot \sigma_1(z') dz'. \quad (6)$$

For $\sigma_{SEC}(z) = \sigma_D(z)$, by the comparison between equations (2) and (6) the following equation can be obtained $$\sum_j w(z_j) \cdot g_{BV}(z - z_j) = g_{DV}(z). \quad (7)$$

Hence, with the coefficients $w(z_j)$ known, equation (4) can be used to conduct the skin-effect correction for induction logging data. It can be seen that the SEC for induction logging data is equivalent to the convolution filtering based on a correction coefficient library.

In order to determine the filter coefficients $w(z_j)$, equation (7) can be solved by using an optimization algorithm, such as the least-square method. As a result of equation (7) the correction filter coefficients $w(z_j)$ can be pre-calculated, and they can be assembled into a correction table/library for different conductivity values, which can be stored in a memory device or a database. In a homogeneous medium, the constraint for w(z) from equation (4) is given by $$\sum_j w(z_j) = \frac{\sigma_t}{\sigma_R}, \quad (8)$$

where $\sigma_R$ is the R-signal apparent conductivity including the skin effect in homogeneous media with true conductivity $\sigma_t$.

Figure 7:
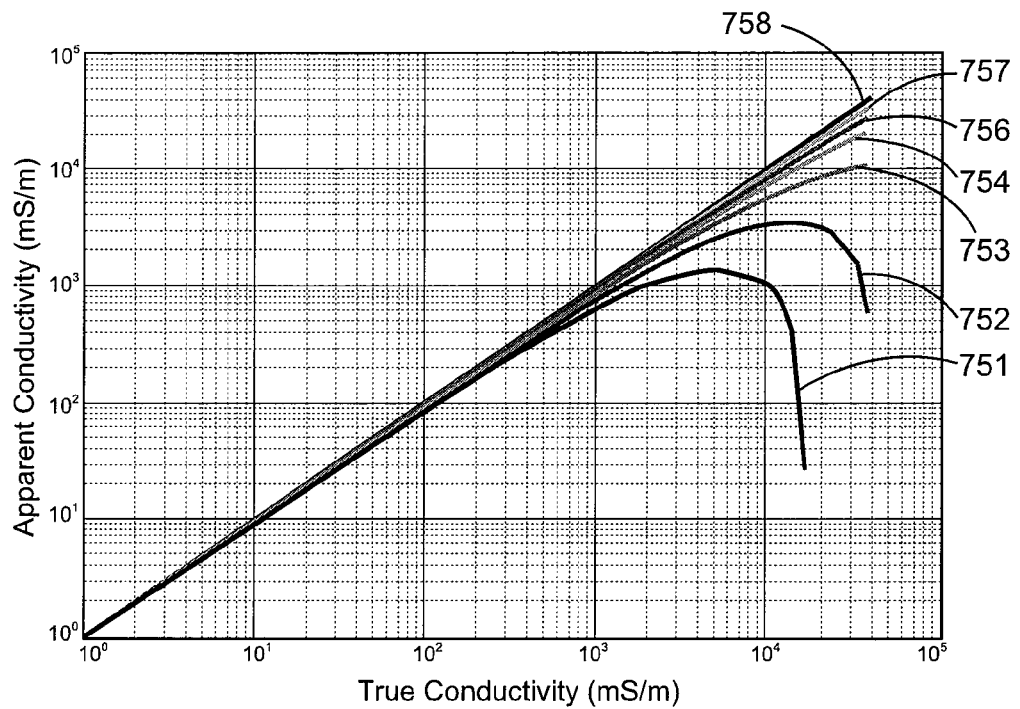
FIGS. 7-9 show the results of comparison of true conductivity and R-signal apparent conductivity for resistivity tools having transmitter-receiver sub-arrays operating at different frequencies in homogeneous formations, in accordance with various embodiments.
Figure 8:
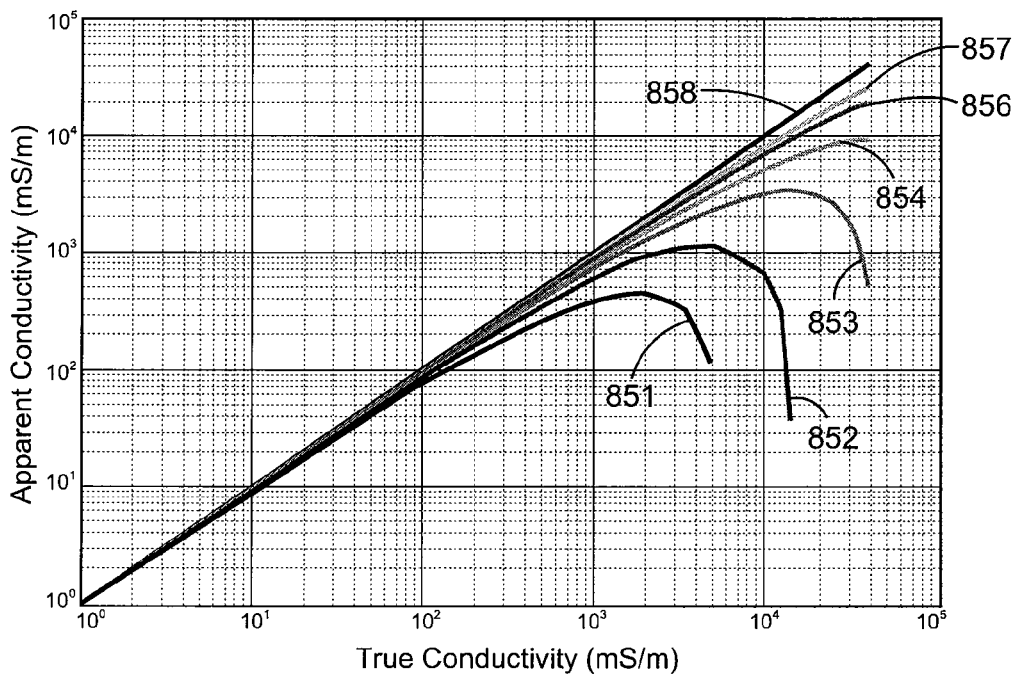
Figure 9:
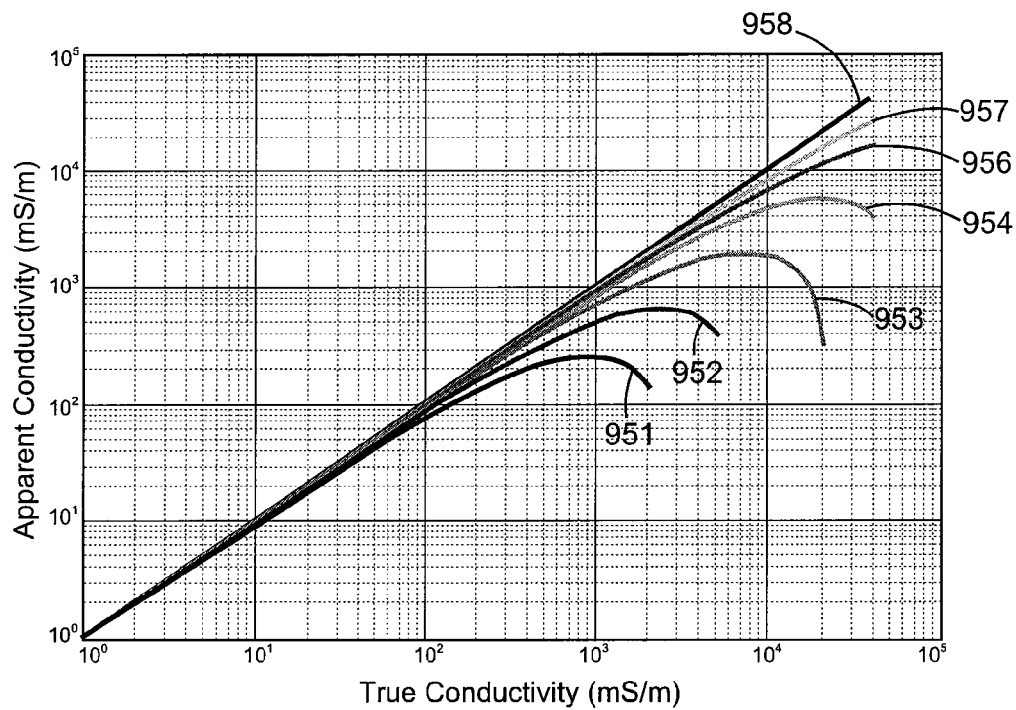

FIGS. 7-9 show the results of comparison of true conductivity and R-signal apparent conductivity for ACRt/HACRt tool operating at 12 kHz, 36 kHz, and 72 kHz, respectively, in homogeneous formations. These curves demonstrate that the R-signal apparent conductivity deviates from the true conductivity at higher conductivities. In addition, these curves demonstrate that the R-signal apparent conductivity deviates less from the true conductivity for measurements using shorter transmitter to receiver spacings. In order to test the SEC process using single-frequency R-signal measurements, computed ACRt/HACRt logs were used for demonstrating the performance of embodiments of the SEC method in oil-base mud (OBM) and water-base mud (WBM) wells. In FIG. 7, the curve 751 is for a sub-array having a transmitter-receiver separation of 80 inches. The curve 752 is for a sub-array having a transmitter-receiver separation of 50 inches. The curve 753 is for a sub-array having a transmitter-receiver separation of 29 inches. The curve 754 is for a sub-array having a transmitter-receiver separation of 17 inches. The curve 756 is for a sub-array having a transmitter-receiver separation of 9.6 inches. The curve 757 is for a sub-array having a transmitter-receiver separation of 6 inches. The curve 758 is a curve for the true conductivity.

In FIG. 8, the curve 851 is for a sub-array having a transmitter-receiver separation of 80 inches. The curve 852 is for a sub-array having a transmitter-receiver separation of 50 inches. The curve 853 is for a sub-array having a transmitter-receiver separation of 29 inches. The curve 854 is for a sub-array having a transmitter-receiver separation of 17 inches. The curve 856 is for a sub-array having a transmitter-receiver separation of 9.6 inches. The curve 857 is for a sub-array having a transmitter-receiver separation of 6 inches. The curve 858 is a curve for the true conductivity.

In FIG. 9, the curve 951 is for a sub-array having a transmitter-receiver separation of 80 inches. The curve 952 is for a sub-array having a transmitter-receiver separation of 50 inches. The curve 953 is for a sub-array having a transmitter-receiver separation of 29 inches. The curve 954 is for a sub-array having a transmitter-receiver separation of 17 inches. The curve 956 is for a sub-array having a transmitter-receiver separation of 9.6 inches. The curve 957 is for a sub-array having a transmitter-receiver separation of 6 inches. The curve 958 is a curve for the true conductivity.

Figure 10:
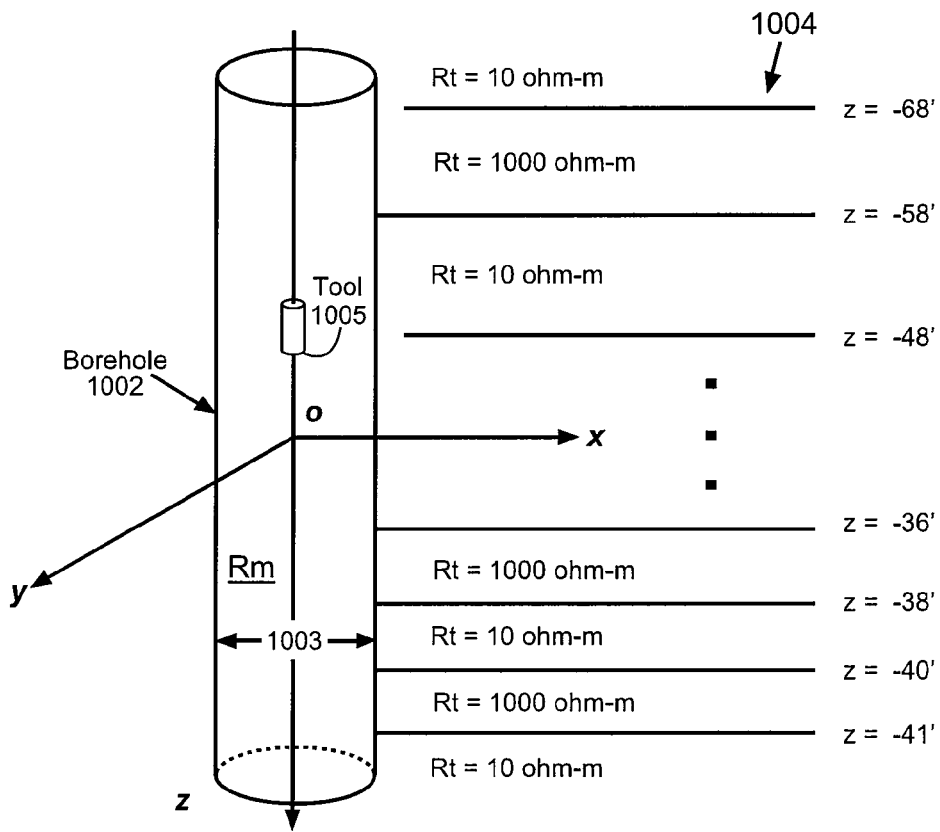
FIG. 10 shows a model including a vertical borehole and chirp formation, in accordance with various embodiments.

FIG. 10 shows a borehole-formation model for simulation of computed logs. The model includes a vertical borehole 1002 and a chirp formation 1004. In this example model, the borehole diameter 1003 is 8.5 inches with zero eccentricity and mud resistivity, $R_m$; and the chirp formation is a 21-layer chirp formation with bed resistivity represented by $R_t$. A chirp formation is a model formation that contains a series of layers of varying thickness or varying bed resistivities. The model shown in FIG. 10 uses an alternating arrangement of a large bed resistivity ($R_t$=1000 ohm-m) and a small bed resistivity ($R_t$=10 ohm-m). Other models can include a series of layers of varying thickness, starting with the thickest layer and ending with the thinnest layer for example. A tool 1005, such as an ACRt/HACRt tool, can be moved to the borehole center, which can be set as the reference, O, such that moving further into the borehole 1002 from the reference along the z-axis is in the positive direction. The direction from the reference to the surface is in the negative z direction.

Figure 11:
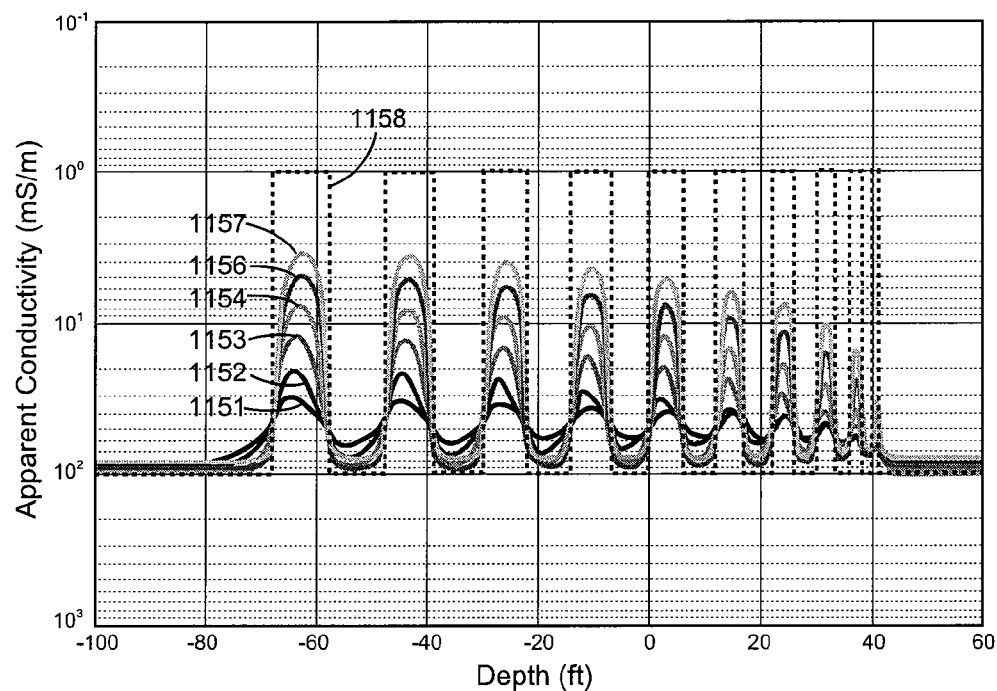
FIGS. 11-13 show apparent conductivity as a function of depth for the model of FIG. 10 in an oil-base mud well with simulated resistivity tools having transmitter-receiver sub-arrays operating at different frequencies, in accordance with various embodiments.
Figure 12:
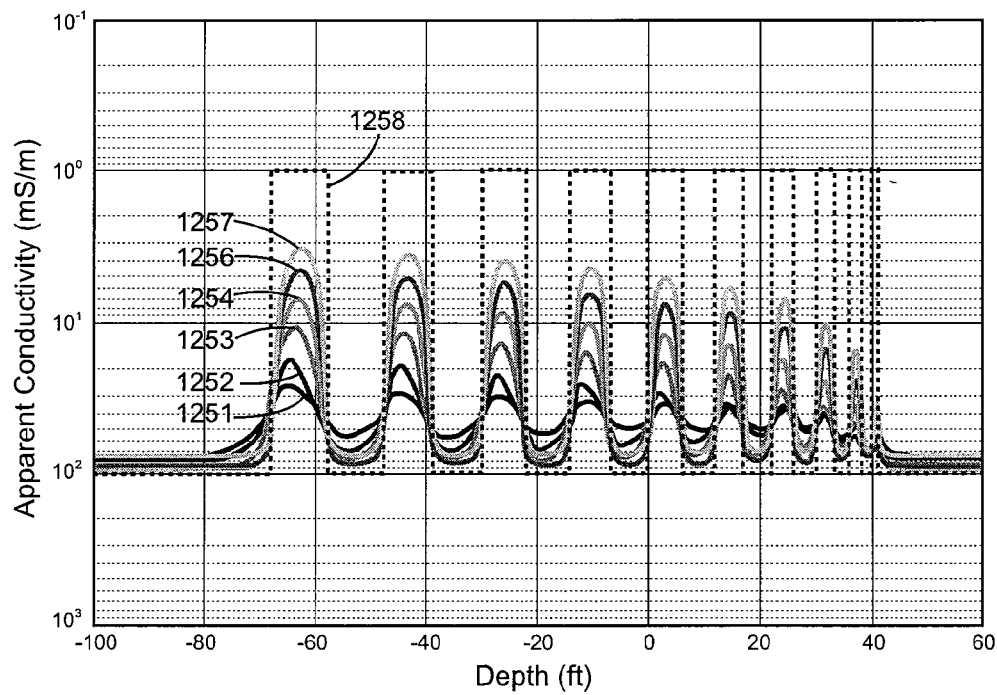
Figure 13:
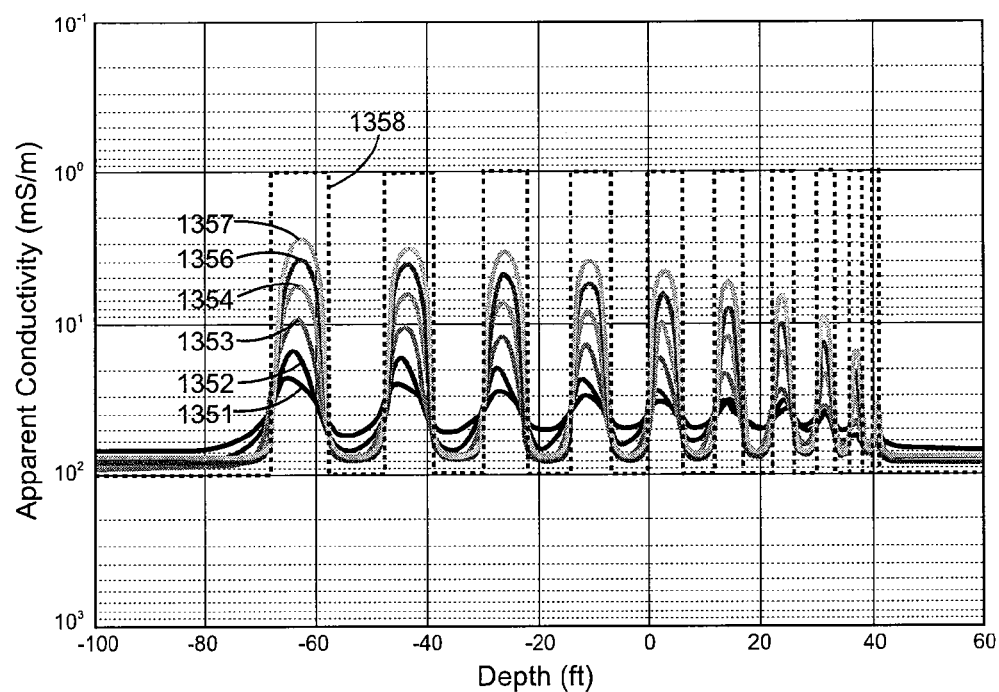
Figure 14:
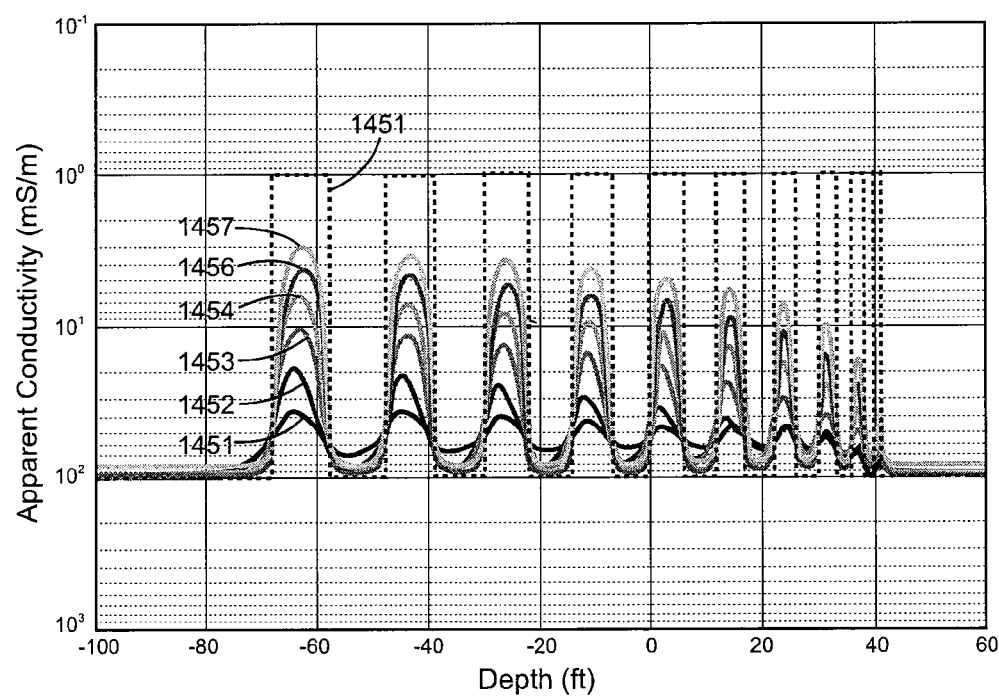
FIG. 14 shows skin-effect correction logs of an oil-base mud well with the chirp formation of FIG. 10, obtained with a single-frequency skin-effect correction process for simulated resistivity tools having transmitter-receiver sub-arrays, in accordance with various embodiments.

Simulations of two modeled log examples were made. The first modeled log example is in an OBM well and the second is a WBM well. FIGS. 11-13 show apparent conductivity as a function of depth for the model of FIG. 10 with mud resistivity $R_m$=1000 ohm-m in the OBM well and with a simulated ACRt/HACRt tool operating at 12 kHz, 36 kHz, and 72 kHz, respectively, for these logs. For comparison, corresponding SEC logs for the model of FIG. 10 are shown in FIG. 14 with the single-frequency SEC method. In FIG. 11, the curve 1151 is for a sub-array having a transmitter-receiver separation of 80 inches. The curve 1152 is for a sub-array having a transmitter-receiver separation of 50 inches. The curve 1153 is for a sub-array having a transmitter-receiver separation of 29 inches. The curve 1154 is for a sub-array having a transmitter-receiver separation of 17 inches. The curve 1156 is for a sub-array having a transmitter-receiver separation of 9.6 inches. The curve 1157 is for a sub-array having a transmitter-receiver separation of 6 inches. The curve 1158 is a curve for the true conductivity of the modeled example.

In FIG. 12, the curve 1251 is for a sub-array having a transmitter-receiver separation of 80 inches. The curve 1252 is for a sub-array having a transmitter-receiver separation of 50 inches. The curve 1253 is for a sub-array having a transmitter-receiver separation of 29 inches. The curve 1254 is for a sub-array having a transmitter-receiver separation of 17 inches. The curve 1256 is for a sub-array having a transmitter-receiver separation of 9.6 inches. The curve 1257 is for a sub-array having a transmitter-receiver separation of 6 inches. The curve 1258 is a curve for the true conductivity of the modeled example.

In FIG. 13, the curve 1351 is for a sub-array having a transmitter-receiver separation of 80 inches. The curve 1352 is for a sub-array having a transmitter-receiver separation of 50 inches. The curve 1353 is for a sub-array having a transmitter-receiver separation of 29 inches. The curve 1354 is for a sub-array having a transmitter-receiver separation of 17 inches. The curve 1356 is for a sub-array having a transmitter-receiver separation of 9.6 inches. The curve 1357 is for a sub-array having a transmitter-receiver separation of 6 inches. The curve 1358 is a curve for the true conductivity of the modeled example.

Figure 15:
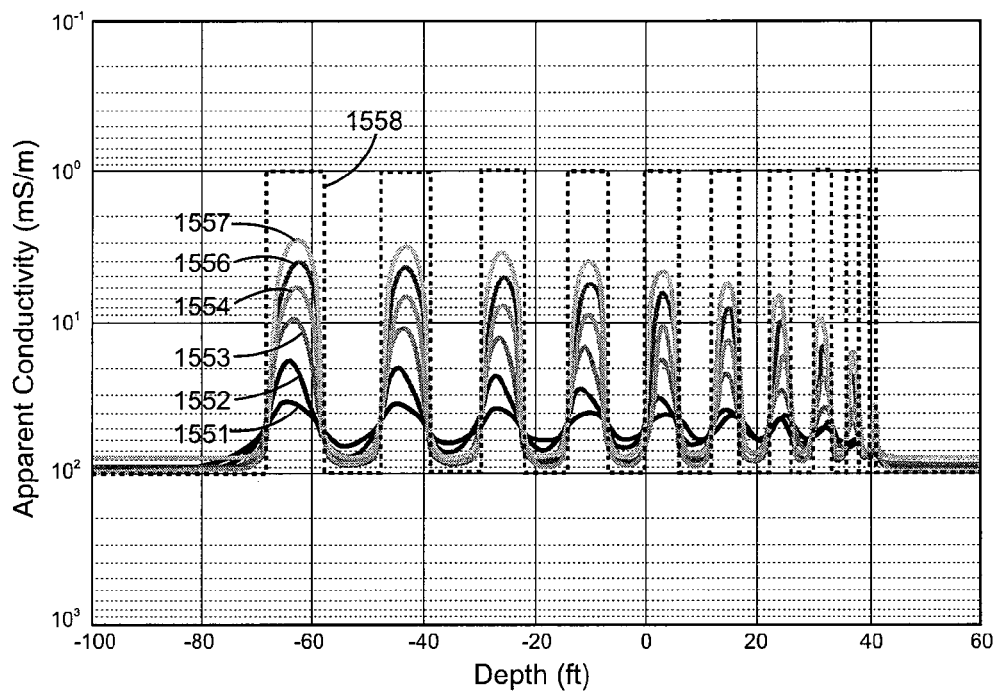
FIG. 15 shows skin-effect correction logs of an oil-base mud well with the chirp formation of FIG. 10, obtained with a three-frequency skin-effect correction method for simulated resistivity tools having transmitter-receiver sub-arrays, in accordance with various embodiments.

FIG. 14 shows SEC logs of the OBM well with the chirp formation of FIG. 10, obtained with a single-frequency SEC process at the single frequency of 36 kHz for the simulated ACRt/HACRt tool. For comparison purposes, FIG. 15 shows SEC logs of the OBM well with the chirp formation of FIG. 10, obtained with the three-frequency SEC method at frequencies of 12 kHz, 36 kHz, and 72 kHz for the simulated ACRt/HACRt tool. Due to the large resistivity contrast (1000/10) between the bed and shoulder resistivity, all array responses include shoulder effects, especially for long arrays in high resistivity bed sections. With respect to an induction measurement, a shoulder effect is the influence on the induction measurement of a layer of interest by the adjacent layer above or below the layer being measured. From the comparison of FIGS. 14 and 15, good agreement between the single frequency method and multiple frequency method is attained.

In FIG. 14, the curve 1451 is for a sub-array having a transmitter-receiver separation of 80 inches. The curve 1452 is for a sub-array having a transmitter-receiver separation of 50 inches. The curve 1453 is for a sub-array having a transmitter-receiver separation of 29 inches. The curve 1454 is for a sub-array having a transmitter-receiver separation of 17 inches. The curve 1456 is for a sub-array having a transmitter-receiver separation of 9.6 inches. The curve 1457 is for a sub-array having a transmitter-receiver separation of 6 inches. The curve 1458 is a curve for the true conductivity of the modeled example.

In FIG. 15, the curve 1551 is for a sub-array having a transmitter-receiver separation of 80 inches. The curve 1552 is for a sub-array having a transmitter-receiver separation of 50 inches. The curve 1553 is for a sub-array having a transmitter-receiver separation of 29 inches. The curve 1554 is for a sub-array having a transmitter-receiver separation of 17 inches. The curve 1556 is for a sub-array having a transmitter-receiver separation of 9.6 inches. The curve 1557 is for a sub-array having a transmitter-receiver separation of 6 inches. The curve 1558 is a curve for the true conductivity of the modeled example.

Figure 16:
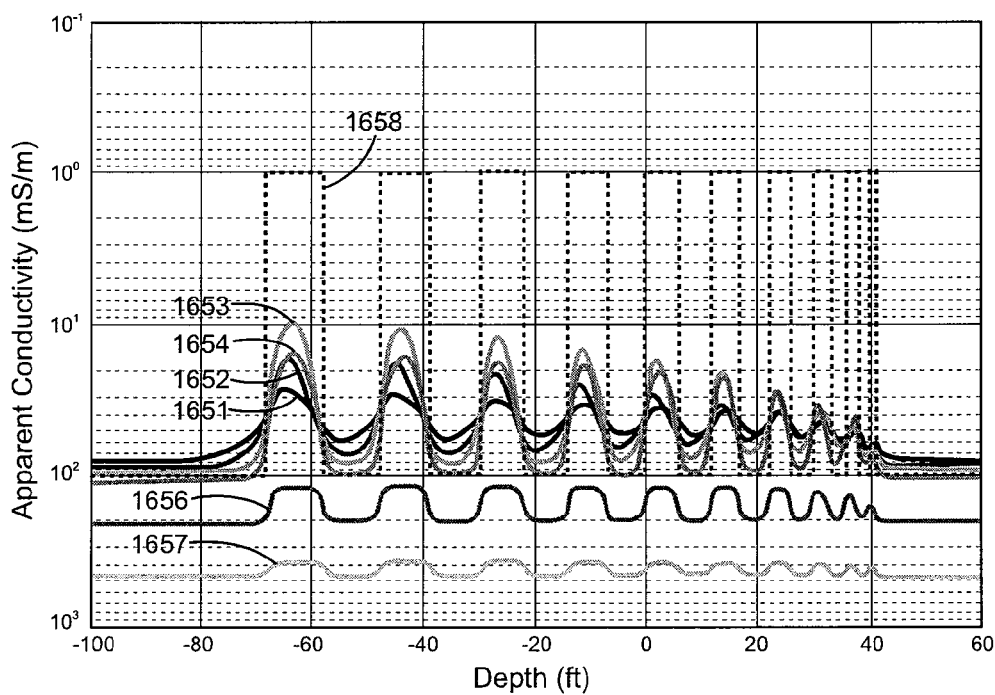
FIG. 16 shows induction logs for the model of FIG. 10 in a water-base mud well with simulated resistivity tools having transmitter-receiver sub-arrays, in accordance with various embodiments.
Figure 17:
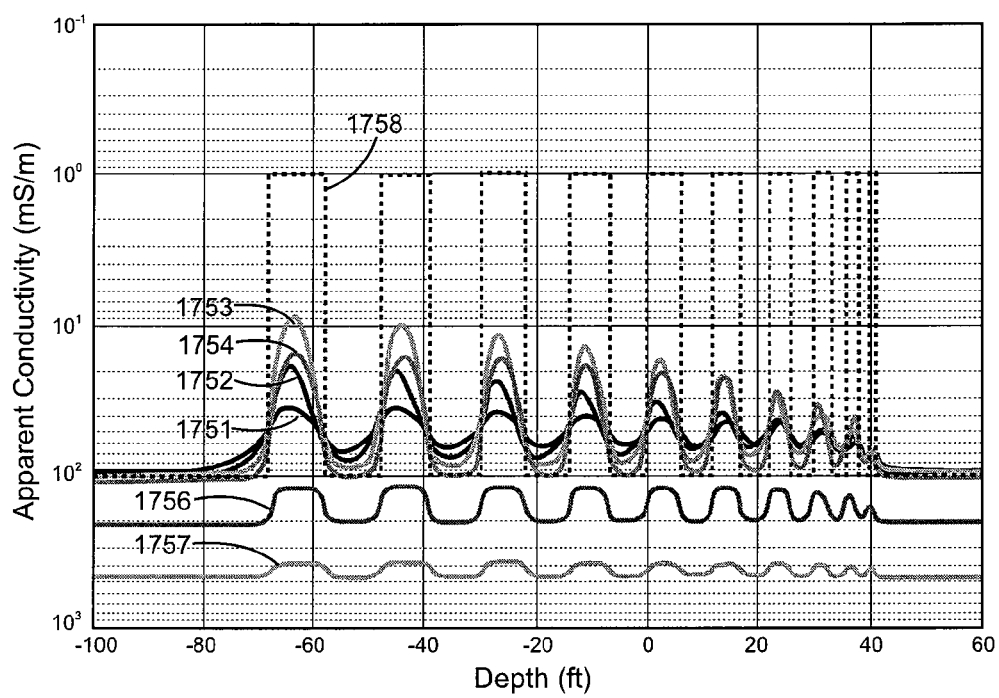
FIG. 17 shows skin effect corrected induction logs for the model of FIG. 10 in a water-base mud well with simulated resistivity tools having transmitter-receiver sub-arrays corresponding to FIG. 16, in accordance with various embodiments.

The second modeled log example is a WBM well. FIGS. 16 and 17 show apparent conductivity as a function of depth for the model of FIG. 10 but the borehole 1002 is filled with a WBM having mud resistivity Rm=0.5 ohm-m to replace the OBM. FIG. 16 shows ACRt/HACRt 36 kHz logs and FIG. 17 shows SEC logs corresponding to the ACRt/HACRt 36 kHz logs of FIG. 16. The results of both cases are comparable to the standard multi-frequency method.

In FIG. 16, the curve 1651 is for a sub-array having a transmitter-receiver separation of 80 inches. The curve 1652 is for a sub-array having a transmitter-receiver separation of 50 inches. The curve 1653 is for a sub-array having a transmitter-receiver separation of 29 inches. The curve 1654 is for a sub-array having a transmitter-receiver separation of 17 inches. The curve 1656 is for a sub-array having a transmitter-receiver separation of 9.6 inches. The curve 1657 is for a sub-array having a transmitter-receiver separation of 6 inches. The curve 1658 is a curve for the true conductivity of the modeled example.

In FIG. 17, the curve 1751 is for a sub-array having a transmitter-receiver separation of 80 inches. The curve 1752 is for a sub-array having a transmitter-receiver separation of 50 inches. The curve 1753 is for a sub-array having a transmitter-receiver separation of 29 inches. The curve 1754 is for a sub-array having a transmitter-receiver separation of 17 inches. The curve 1756 is for a sub-array having a transmitter-receiver separation of 9.6 inches. The curve 1757 is for a sub-array having a transmitter-receiver separation of 6 inches. The curve 1758 is a curve for the true conductivity of the modeled example.

In various embodiments, a SEC algorithm based on correction tables can be applied to induction log data. The SEC process can be directly derived from inhomogeneous-media assumption. SEC methods based on correction tables as discussed herein can provide various enhancements to SEC methods such as single-frequency SEC procedures using both a R-signal and a X-signal and multi-frequency SEC procedures. For example, using induction data at only one frequency may reduce complexity associated with conventional multi-frequency SEC methods. A SEC procedure based on correction tables can be used with multi-frequency techniques in cases where, due to poor quality data, only one frequency data is available. As shown by the examples provided herein, SEC logs from a SEC algorithm based on correction tables provide good results compared to the SEC logs from a three-frequency correction method. In comparison with conventional methods, few parameters affecting the SEC results are determined by personal experience. In addition, a SEC process that only uses the R-signal induction data does not depend on X-signal.

Various components of a system operable to calculate an apparent conductivity having a skin-effect correction by conducting a convolution filtering of conductivity values and weight coefficients, where the conductivity values can be derived from R-signal data and the weight coefficients selected as pre-determined values, as described herein or in a similar manner, can be realized in combinations of hardware and software based implementations. These implementations may include a machine-readable storage device having machine-executable instructions, such as a computer-readable storage device having computer-executable instructions, to collect R-signal data from a receiver of an induction logging tool, the R-signal data corresponding to the induction logging tool operating at a single frequency over a length of a borehole; retrieve weight coefficients from a database, each of the weight coefficients corresponding to a distance in the length; calculate an apparent conductivity having a skin-effect correction by conducting a convolution filtering of conductivity values and the weight coefficients, the conductivity values derived from the R-signal data; and output the apparent conductivity. The instructions can include instructions to operate a tool having one or more transmitters and one or more receivers to provide data to a data processing unit in accordance with the teachings herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

Figure 18:
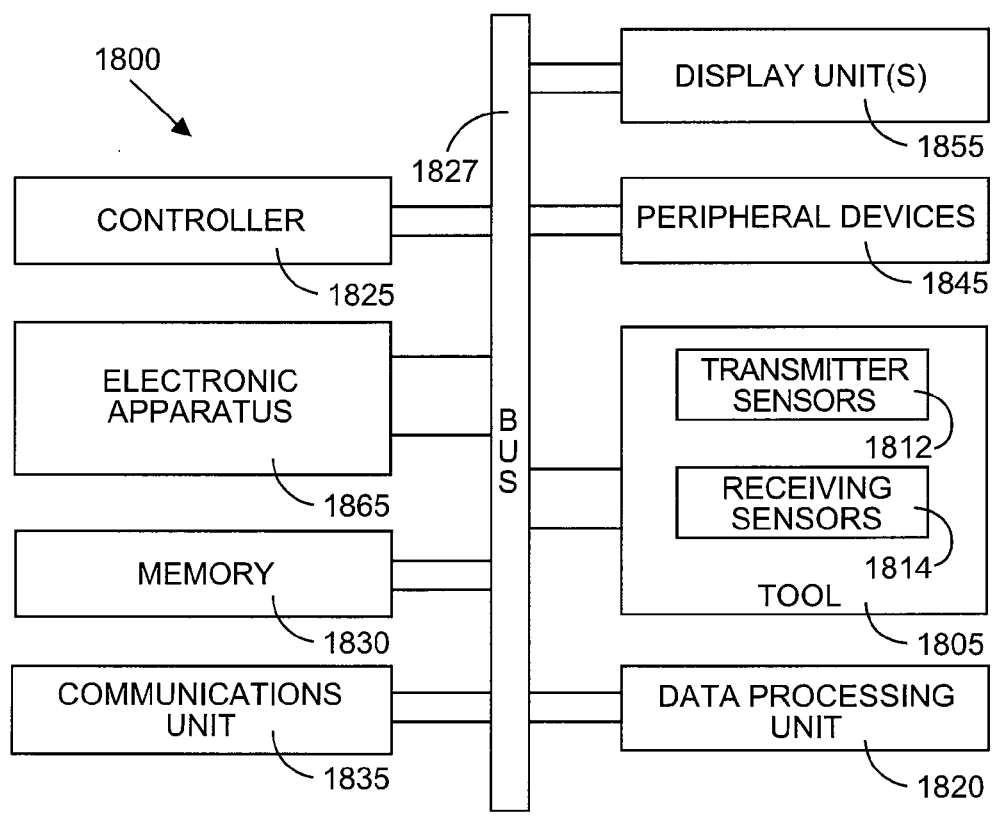
FIG. 18 depicts a block diagram of features of an example system having a data processing unit operable to provide skin-effect correction using R-signal data and weight coefficients, in accordance with various embodiments.

FIG. 18 depicts a block diagram of features of an example embodiment of a system 1800 operable to calculate an apparent conductivity having a skin-effect correction by conducting a convolution filtering of conductivity values and weight coefficients, where the conductivity values can be derived from R-signal data and the weight coefficients selected as pre-determined values, as described herein or in a similar manner. The system 1800 can include a tool 1805 having an arrangement of transmitter sensors 1812 and receiver sensors 1814 that can be realized in a similar or identical manner to arrangements of sensors discussed herein. The system 1800 can be configured to operate in accordance with the teachings herein.

The system 1800 can include a controller 1825, a memory 1830, an electronic apparatus 1865, and a communications unit 1835. The memory 1830 can be structured to include a database. The controller 1825, the memory 1830, and the communications unit 1835 can be arranged to operate as a processing unit to control operation of the transmitter sensors 1812 and the receiver sensors 1814 and to perform operations on the signals collected by the receiver sensors 1814 to generate skin-effect corrections to characteristics of formations probed by the transmitter sensors 1812 in a manner similar or identical to the procedures discussed herein. A data processing unit 1820, structured to calculate an apparent conductivity having a skin-effect correction and operable to conduct a convolution filtering of conductivity values and the weight coefficients, where the conductivity values can be derived from the measured R-signal data, can be implemented as a single unit or distributed among the components of the system 1800 including electronic apparatus 1865. The controller 1825 and the memory 1830 can operate to control activation of the transmitter sensors 1812 and selection of the receiver sensors 1814 in the tool 1805 and to manage processing schemes in accordance with measurement procedures and signal processing as described herein. The data processing unit 1820 and other components of the system 1800 can be configured, for example, to operate similar to or identical to the components discussed herein or similar to or identical to any of methods discussed herein.

The communications unit 1835 can include downhole communications for appropriately located sensors in a drilling operation. Such downhole communications can include a telemetry system. The communications unit 1835 may use combinations of wired communication technologies and wireless technologies at frequencies that do not interfere with on-going measurements.

The system 1800 can also include a bus 1827, where the bus 1827 provides electrical conductivity among the components of the system 1800. The bus 1827 can include an address bus, a data bus, and a control bus, each independently configured or in an integrated format. The bus 1827 can be realized using a number of different communication mediums that allows for the distribution of components of the system 1800. Use of the bus 1827 can be regulated by the controller 1825.

In various embodiments, peripheral devices 1845 can include additional storage memory and other control devices that may operate in conjunction with the controller 1825 and the memory 1830. In an embodiment, the controller 1825 can be realized as a processor or a group of processors that may operate independently depending on an assigned function.

The system 1800 can include display unit(s) 1855 as a distributed component on the surface at a drilling operation, which can be used with instructions stored in the memory 1830 to implement a user interface to monitor the operation of the tool 1805 or components distributed within the system 1800. The user interface may be used to input parameter values for thresholds such that the system 1800 can operate autonomously substantially without user intervention. The user interface can also provide for manual override and change of control of the system 1800 to a user. Such a user interface can be operated in conjunction with the communications unit 1835 and the bus 1827.

Figure 19:
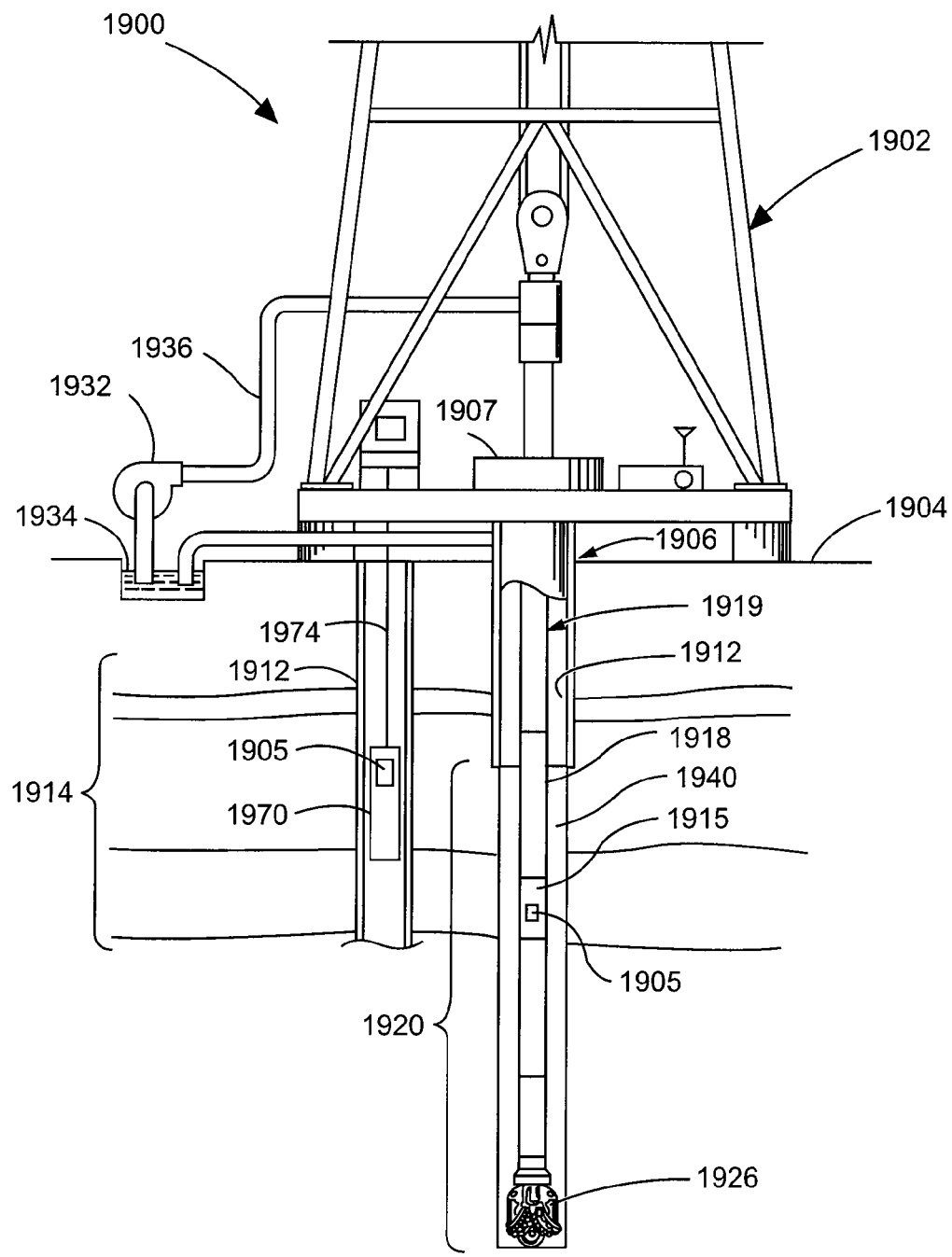
FIG. 19 depicts an example system at a drilling site, where the system includes a tool configured with a data processing unit operable to provide skin-effect correction, in accordance with various embodiments.

FIG. 19 depicts an embodiment of a system 1900 at a drilling site, where the system 1900 includes a tool 1905 having one or more transmitters and one or more receivers arranged to provide R-signal data of an induction logging tool, where the R-signal data corresponds to the induction logging tool operating at a single frequency over a length of a borehole, and having a data processing unit arranged to calculate an apparent conductivity having a skin-effect correction by conducting a convolution filtering of conductivity values and weight coefficients, the conductivity values derived from the R-signal data and the weight coefficients retrieved from a database. The tool 1905 can be distributed among the components of system 1900. The tool 1905 can be realized in a similar or identical manner to arrangements of transmitters, receivers, and data processing units discussed herein. The tool 1905 can be structured and fabricated in accordance with various embodiments as taught herein with respect to transmitters, receivers, and data processing units to perform skin-effect correction to measured formation characteristics.

The system 1900 can include a drilling rig 1902 located at a surface 1904 of a well 1906 and a string of drill pipes, that is, the drill string 1908, connected together so as to form a drilling string that is lowered through a rotary table 1907 into a wellbore or borehole 1912. The drilling rig 1902 can provide support for the drill string 1908. The drill string 1908 can operate to penetrate the rotary table 1907 for drilling the borehole 1912 through subsurface formations 1914. The drill string 1908 can include drill pipe 1918 and a bottom hole assembly 1920 located at the lower portion of the drill pipe 1918.

The bottom hole assembly 1920 can include a drill collar 1915, the tool 1905 attached to the drill collar 1915, and a drill bit 1926. The drill bit 1926 can operate to create the borehole 1912 by penetrating the surface 1904 and the subsurface formations 1914. The tool 1905 can be structured for an implementation in the borehole 1912 as a MWD system such as a LWD system. The housing containing the tool 1905 can include electronics to activate one or more transmitters of the tool 1905 and collect responses from one or more receivers of the tool 1905. Such electronics can include a data unit to provide formation characteristics corrected for skin effect to the surface over a standard communication mechanism for operating a well. Alternatively, electronics can include a communications interface to provide signals output by receivers of the tool 1905 to the surface over a standard communication mechanism for operating a well, where these output signals can be analyzed at a processing unit at the surface to provide formation characteristics corrected for skin effect.

During drilling operations, the drill string 1908 can be rotated by the rotary table 1907. In addition to, or alternatively, the bottom hole assembly 1920 can also be rotated by a motor (e.g., a mud motor) that is located downhole. The drill collars 1915 can be used to add weight to the drill bit 1926. The drill collars 1915 also can stiffen the bottom hole assembly 1920 to allow the bottom hole assembly 1920 to transfer the added weight to the drill bit 1926, and in turn, assist the drill bit 1926 in penetrating the surface 1904 and subsurface formations 1914.

During drilling operations, a mud pump 1932 can pump drilling fluid (sometimes known by those of skill in the art as "drilling mud") from a mud pit 1934 through a hose 1936 into the drill pipe 1918 and down to the drill bit 1926. The drilling fluid can flow out from the drill bit 1926 and be returned to the surface 1904 through an annular area 1940 between the drill pipe 1918 and the sides of the borehole 1912. The drilling fluid may then be returned to the mud pit 1934, where such fluid is filtered. In some embodiments, the drilling fluid can be used to cool the drill bit 1926, as well as to provide lubrication for the drill bit 1926 during drilling operations. Additionally, the drilling fluid may be used to remove subsurface formation 1914 cuttings created by operating the drill bit 1926.

In various embodiments, the tool 1905 may be included in a tool body 1970 coupled to a logging cable 1974 such as, for example, for wireline applications. The tool body 1970 containing the tool 1905 can include electronics to activate one or more transmitters of the tool 1905 and collect responses from one or more receivers of the tool 1905. Such electronics can include a data unit to provide formation characteristics corrected for skin effect to the surface over a standard communication mechanism for operating a well. Alternatively, electronics can include a communications interface to provide signals output by receivers of the tool 1905 to the surface over a standard communication mechanism for operating a well, where these output signals can be analyzed at a processing unit at the surface to provide formation characteristics corrected for skin effect. The logging cable 1974 may be realized as a wireline (multiple power and communication lines), a mono-cable (a single conductor), and/or a slick-line (no conductors for power or communications), or other appropriate structure for use in the bore hole 1912.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   generating probe signals into a formation from a transmitter of an induction logging tool that comprises the transmitter and a plurality of receivers longitudinally disposed along a length of a borehole;
   receiving signals in at least one of the receivers in response to generating the probe signals, the received signals including R-signal data;
   collecting the R-signal data over a logging section of the borehole from the receivers, the R-signal data corresponding to the induction logging tool operating at a single frequency or multiple frequencies;
   selecting weight coefficients corresponding to a depth window of the induction logging tool along the length of the borehole, the weight coefficients based on a relationship to a geometric factor of the induction logging tool; and
   conducting a convolution filtering of conductivity values derived from the R-signal data and the weight coefficients to determine a skin-effect correction for the conductivity values.

2. The method of claim 1, wherein the skin-effect correction is determined using only R-signal data from single-frequency R-signal measurements.

3. The method of claim 1, wherein the skin-effect correction is based on a pre-calculated correction coefficient library.

4. The method of claim 1 further comprising generating the skin-effect corrected conductivity values as defined by $$\sigma_{SEC}(z) = \sum_j w(z_j) \cdot \sigma_R(z - z_j),$$

where $\sigma_R(z-z_j)$ is apparent conductivity derived from R-signal data at $z-z_j$, and $w(z_j)$ is a weight coefficient at distance $z_j$.

5. The method of claim 1, wherein the method includes generating the weight coefficients and storing the weight coefficients in a database prior to collecting the R-signal data.

6. The method of claim 1, wherein generating the weight coefficients includes generating the weight coefficients from processing a relationship given by $$\sum_j w(z_j) \cdot g_{BV}(z - z_j) = g_{DV}(z),$$

where $v(z_j)$ is a weight coefficient at distance $z_j$, $g_{DV}(z)$ is a Doll vertical geometrical factor, and $g_{BV}(z-z_j)$ is a real part of a Born vertical geometric factor at $z-z_j$.

7. The method of claim 6, wherein processing the relationship includes using a least squares method.

8. The method of claim 1, wherein selecting the weight coefficients corresponding to the depth window further comprises selecting the weight coefficients also based, at least in part, on a separation distance between the transmitter and at least one of the receivers.

9. A system comprising:
an induction logging tool that comprises at least one transmitter and a plurality of receivers longitudinally disposed along a length of a borehole, the transmitter and the receivers set apart from each other by separation distances;
a control unit operable to manage generation of transmission signals from the transmitter into a formation around a borehole, and manage collection of received signals at the receivers, each received signal based on one of the transmission signals, wherein the transmitter and the receivers are arranged to collect logging data such that R-signal data is operably provided to the control unit; and
a data processing unit, wherein the induction logging tool, the control unit, and the data processing unit are configured to operate to:
collect the R-signal data over a logging section of the borehole from the receivers, the R-signal data corresponding to the induction logging tool operating at a single frequency or multiple frequencies;
retrieve weight coefficients from a database, each of the weight coefficients corresponding to a distance in a depth window along the length of the borehole, the weight coefficients based on a relationship to a geometric factor of the induction logging tool; and
calculate a skin-effect correction apparent conductivity having a skin-effect correction by conducting a convolution filtering of conductivity values and the weight coefficients, the conductivity values derived from the R-signal data.

10. The system of claim 9, wherein the induction logging tool, the control unit, and the data processing unit are further configured to select the weight coefficients corresponding to the depth window based, at least in part, on the separation distances.

11. An apparatus comprising:
an induction logging tool that comprises a transmitter and a plurality of receivers longitudinally disposed along a length of a borehole, the transmitter operable to probe a formation and the receivers operable to receive signals in response to the probe;
a first interface arranged to collect R-signal data over the length of the borehole from the receivers, the R-signal data corresponding to the induction logging tool operated at a single frequency, wherein the receivers and the transmitter are arranged to collect logging data such that the R-signal data is operably provided to the first interface;
a database arranged to store and to provide access to weight coefficients, each of the weight coefficients corresponding to a distance in the length, the weight coefficients based on a relationship to a geometric factor of the induction logging tool;
a data processing unit structured to calculate a skin-effect correction apparent conductivity having a skin-effect correction, the data processing unit operable to conduct a convolution filtering of conductivity values and the weight coefficients, the conductivity values derived from the R-signal data; and
a second interface to output the skin-effect correction apparent conductivity.

12. The apparatus of claim 11, wherein the receivers are separated from the transmitter by different distances.

13. The apparatus of claim 11, wherein the apparatus includes a control unit structured to control the plurality of receivers and the transmitter to provide signals to the data processing unit, the data processing unit structured to use operatively only R-signal data from single-frequency R-signal measurements to generate the skin-effect correction.

14. The apparatus of claim 11, wherein the apparatus includes a control unit structured to control the plurality of receivers and the transmitter to operate at a plurality of operating frequencies and provide signals to the data processing unit, the data processing unit structured to operatively select a mode of operation from a single frequency mode or a multiple frequencies mode.

15. The apparatus of claim 11, wherein the database includes a pre-calculated correction coefficient library to generate the skin-effect correction.

16. The apparatus of claim 11, wherein the data processing unit is structured to operatively generate the weight coefficients and store the weight coefficients in the database.

17. The apparatus of claim 16, wherein the data processing unit is structured to generate the weight coefficients by operatively using a least squares procedure.

18. The apparatus of claim 11, wherein the data processing unit is structured to operatively calculate the skin-effect correction apparent conductivity having the skin-effect correction by generation of the apparent conductivity after the skin-effect correction as defined by $$\sigma_{SEC}(z) = \sum_j w(z_j) \cdot \sigma_R(z - z_j),$$

where $\sigma_R(z-z_j)$ is apparent conductivity derived from R-signal data at $z-z_j$, and $w(z_j)$ is a weigh coefficient at distance $z_j$.

19. The apparatus of claim 11, wherein the transmitter and the receivers are disposed apart from each other by a separation distance, and wherein the weight coefficients corresponding the depth window are selected based, at least in part, on the separation distance.

* * * * *